(12) United States Patent
Parry et al.

(10) Patent No.: US 7,206,404 B2
(45) Date of Patent: Apr. 17, 2007

(54) COMMUNICATIONS SYSTEM AND METHOD UTILIZING CENTRALIZED SIGNAL PROCESSING

(75) Inventors: James H. Parry, Saratoga, CA (US); Peter Hsiang, Cupertino, CA (US)

(73) Assignee: Tandberg Telecom AS, Lysaker (NO)

( * ) Notice: Subject to any disclaimer, the term of this patent is extended or adjusted under 35 U.S.C. 154(b) by 150 days.

(21) Appl. No.: 11/124,772

(22) Filed: May 9, 2005

(65) Prior Publication Data
US 2005/0207567 A1 Sep. 22, 2005

Related U.S. Application Data

(63) Continuation of application No. 09/660,205, filed on Sep. 12, 2000, now abandoned.

(51) Int. Cl.
*H04M 9/08* (2006.01)
(52) U.S. Cl. ............ 379/406.01; 379/406.08; 381/94.1; 381/95
(58) Field of Classification Search .......... 379/202.01, 379/406.01, 406.05, 406.06, 408.08; 381/26, 381/80, 82, 93, 94.1, 94.2, 95–96
See application file for complete search history.

(56) References Cited

U.S. PATENT DOCUMENTS

| | | |
|---|---|---|
| 4,475,189 A | 10/1984 | Herr et al. |
| 4,482,998 A | 11/1984 | Marouf et al. |
| 4,550,224 A | 10/1985 | Winchell |
| 4,558,180 A | 12/1985 | Scordo |
| 4,720,850 A | 1/1988 | Oberlander et al. |
| 4,965,822 A | 10/1990 | Williams |
| 5,379,280 A | 1/1995 | Cotton et al. |
| 5,734,724 A | 3/1998 | Kinoshita et al. |
| 5,764,759 A | 6/1998 | Hamilton et al. |
| 5,883,944 A | 3/1999 | Burke et al. |
| 5,936,662 A | 8/1999 | Kim et al. |
| 5,987,098 A | 11/1999 | Wintour |
| 6,008,838 A | 12/1999 | Iizawa |
| 6,304,645 B1 | 10/2001 | Holland et al. |
| 6,389,440 B1 | 5/2002 | Lewis et al. |

(Continued)

*Primary Examiner*—Binh K. Tieu
(74) *Attorney, Agent, or Firm*—Oblon, Spivak, McClelland, Maier & Neustadt, P.C.

(57) ABSTRACT

A communications system and method performs centralized signal processing on received audio signals. A plurality of terminals are coupled to a processing switch via links. The terminals can be, for example, dedicated speakerphones, desktop handsets, or personal computers with audio capabilities. The links can be wired or wireless, can carry analog or digital signals, and can be shared with other users in a network. The switch receives the audio data from the terminals, processes the data according to desired acoustical procedures, creates one or more output mixes, and provides the output mixes to the appropriate terminals. The operation of the processing switch is controlled by a communications support module (CSM) which can receive, process, and send data to/from multiple terminals simultaneously. The CSM receives audio signals from the terminals. The CSM uses stored room models holding room model information including data and/or filters representing the acoustic properties of the terminal and/or the environment surrounding the terminal to produce the audio signals. Signal processing (SP) modules provide a pool of SP power from which the CSM can draw to process audio signals received from or being sent to the terminals. The CSM uses the SP modules to perform signal processing including acoustic echo cancellation, automatic gain control, noise reduction. The CSM also uses a mixing module to perform signal mixing.

36 Claims, 2 Drawing Sheets

U.S. PATENT DOCUMENTS

| | | |
|---|---|---|
| 6,501,739 B1 | 12/2002 | Cohen |
| 6,542,600 B1 | 4/2003 | Munson et al. |
| 6,553,122 B1 | 4/2003 | Shimauchi et al. |
| 6,580,793 B1 | 6/2003 | Dunn et al. |
| 6,694,373 B1 | 2/2004 | Sastry et al. |
| 6,738,358 B2 * | 5/2004 | Bist et al. .................. 370/289 |
| 2002/0064139 A1 * | 5/2002 | Bist et al. .................. 370/289 |

* cited by examiner

COMMUNICATIONS SYSTEM AND METHOD UTILIZING CENTRALIZED SIGNAL PROCESSING

CROSS-REFERENCE TO RELATED APPLICATION

This application is a continuation of U.S. Ser. No. 09/660,205, filed on Sep. 12, 2000 now abandoned, entitled COMMUNICATIONS SYSTEM AND METHOD UTILIZING CENTRALIZED SIGNAL PROCESSING, by inventors James H. Parry and Peter Hsiang, currently pending.

FIELD OF INVENTION

This invention pertains in general to telephony and in particular to performing centralized acoustic signal processing on audio signals received from terminals engaged in communications sessions.

BACKGROUND OF INVENTION

Hands-free two-way audio communications systems, such as speakerphones, utilize both a microphone and a speaker. The microphone transmits speech and other sounds from the local terminal to remote terminals while the speaker emits sounds received from remote terminals. In a typical speakerphone system, the speaker and microphone are located in close proximity and sounds produced by the speaker are picked up by the microphone. Without signal processing, therefore, a feedback loop is easily created between the speaker and microphone. This feedback can cause the speaker to emit an undesirable "howling" noise and cause the remote terminals to hear echoes.

One simple technique for eliminating feedback is to provide half-duplex switching where only the microphone or the speaker is active at any given instant. In a typical half-duplex system, the speaker is active until a sound is detected at the microphone. Then, the speaker becomes inactive and the microphone becomes active for the duration of the sound. Half-duplex systems have many inherent problems, not the least of which is that a slight noise may unintentionally cause the speaker to cut out. As a result, it is often difficult to conduct a normal conversation using a speakerphone with a half-duplex switching system.

More sophisticated audio communications systems use complicated adaptive techniques to reduce background noises as well as to regulate gain in the audio channel and eliminate feedback. These techniques identify selected acoustical situations, such as "doubletalk" or "voice not present," and use these identifications to control the rate of adaptation of the signal conditioning methods. Adaptive acoustic echo cancellation (AEC), for example, is performed at the speakerphone and utilizes a sample-by-sample copy of the signal going to the speaker as the basis for an estimate of the echo returning through the microphone. The estimated echo is subtracted on a sample-by-sample basis in an attempt to separate out only that portion of the microphone signal due to sounds coming from sources other than the speaker.

Other signal processing techniques may also be performed at the terminal to improve the quality of the audio signal. For example, frequency shifting is sometimes used to further attenuate loop gain at a particular frequency and thus avoid howling. In addition, a noise reduction algorithm can be used to estimate a frequency dependent profile of the noise floor and attenuate sounds which are temporarily near or below that noise floor. A voice-gated automatic gain control (AGC) can also be used to isolate times during which local speech is thought to be present and then adjust the signal gain so that the speech is near a predetermined level when considered on average.

These solutions can work reasonably well, but the software and hardware for implementing these solutions is integrated into the speakerphone. Thus, the software and hardware must be replicated for each speakerphone and the total cost of the solution depends upon the number of speakerphones in existence. In addition, each speakerphone must be designed and built to some pre-selected level of quality and can not be easily tuned to a particular use or environment. Similarly, it is not easy to change or upgrade the solution implemented by the speakerphone.

Therefore, there is a need in the art for a solution that provides effective signal processing to an audio communications system but does not have costs that scale with the number of speakerphones. Preferably, this solution would also allow the signal processing performed for each speakerphone to be easily tuned or upgraded for a particular use or environment.

DISCLOSURE OF INVENTION

The above needs are met by an audio communications system and method that performs centralized digital signal processing. Since there is no need to provide digital signal processors in the terminals, the cost of the terminals is reduced. Moreover, the present invention allows easy tailoring and upgrading of the capabilities of the communications system.

In an embodiment of the present invention, a plurality of terminals are coupled to a processing switch. The terminals can be, for example, dedicated speakerphones, desktop handsets, or personal computers with audio capabilities. The terminals can be coupled to the switch via wired and/or wireless links.

The processing switch provides support for audio communications. The centralized signal processing capabilities of the switch are provided by a communications support module (CSM). Under direction of the CSM, the switch can receive, process, and send data to/from multiple terminals simultaneously. In addition, the switch can support multiple simultaneous communication sessions, where each session contains two or more terminals engaged in communications.

In one embodiment, the CSM develops and stores room models having data sets representing the acoustic properties of the terminals and/or the terminals' environments. A room model can also hold state information reflecting signals previously sent to the associated terminal.

The CSM is also supported by one or more signal processor (SP) modules. The SP modules provide a pool of processing resources from which the CSM can draw to process audio signals received from or sent to the terminals. In one embodiment, the CSM can dynamically allocate and deallocate SP resources in response to the overall system load on the processing switch or the characteristics of the particular audio signals received from the terminals. Thus, if relatively few communications sessions are being conducted on the switch, more processing power can be allocated to particular signals than if many sessions are occurring simultaneously.

In operation, the processing switch receives audio signals from one or more of the communications terminals. If necessary, the CSM decodes the received audio signals into a formal suitable for further processing. Then, the CSM processes the decoded signals according to desired acoustical procedures.

The CSM uses the SP modules to perform signal processing on the received audio signals. The types of signal processing available include acoustic echo cancellation (AEC), automatic gain control, noise reduction, and signal mixing. Preferably, the CSM uses the room models to determine the optimal signal processing to perform on the audio signals. In one embodiment, the CSM can dynamically allocate SP power to particular audio signals in response to difficult room environments such as rooms having long reverberation times or high noise levels.

The CSM is also preferably supported by a mixing module. The mixing module formulates an output mix for each of the terminals. In general, each terminal's output mix is comprised of a mix of the received audio signals from the other terminals. If only one terminal is producing an audio signal, then the formulated output mix merely contains the processed audio signal from the SP module and the terminal producing the audio signal does not receive the output mix.

DETAILED DESCRIPTION OF THE PREFERRED EMBODIMENTS

Figure 1:
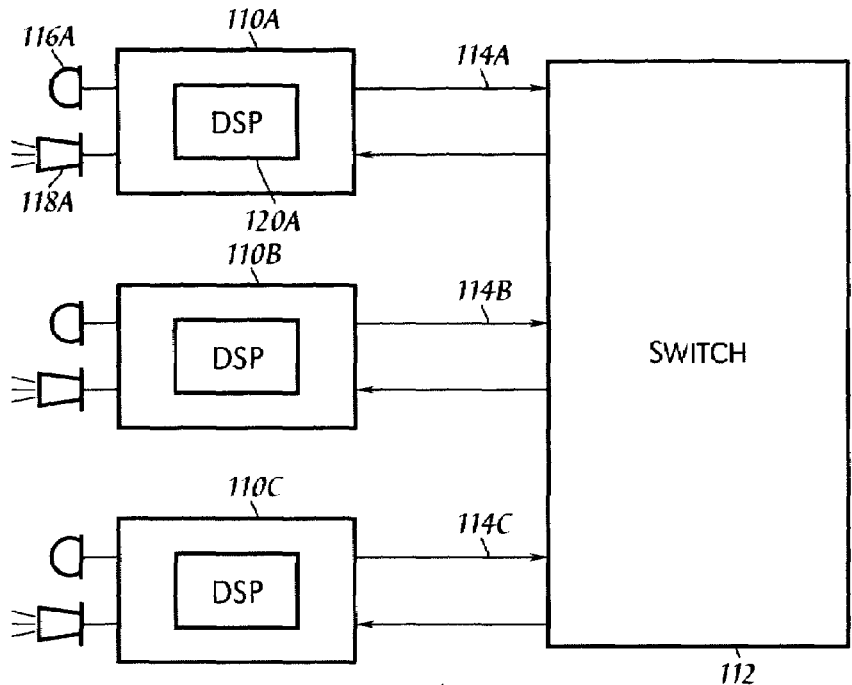
FIG. 1 is a block diagram of a prior art audio communications system.

FIG. 1 is a block diagram of a prior art switched audio communications system 100. A plurality of terminals 110A–C are coupled to a central switch 112 via communications link 114A–C. Each terminal 110, of which terminal 110A is representative, includes a microphone 116A and speaker 118A. As uses herein, a speaker is any device that produces audible motion in response to an electrical signal and a microphone is any device that produces an electrical signal in response to audible motion. The communications links 114 carry sounds picked up by the microphone 116 and to be played by the speaker 118 to/from the switch 112.

The terminal 110 contains a signal processor (SP) 120 with which the terminal performs acoustic echo cancellation (AEC). The AEC removes the speaker 118 sounds that are picked up by the microphone 116. The switch 112 performs switching and routing of audio signals by determining from which terminal an audio signal is being received and to which terminal(s) the audio signal should be sent.

Figure 2:
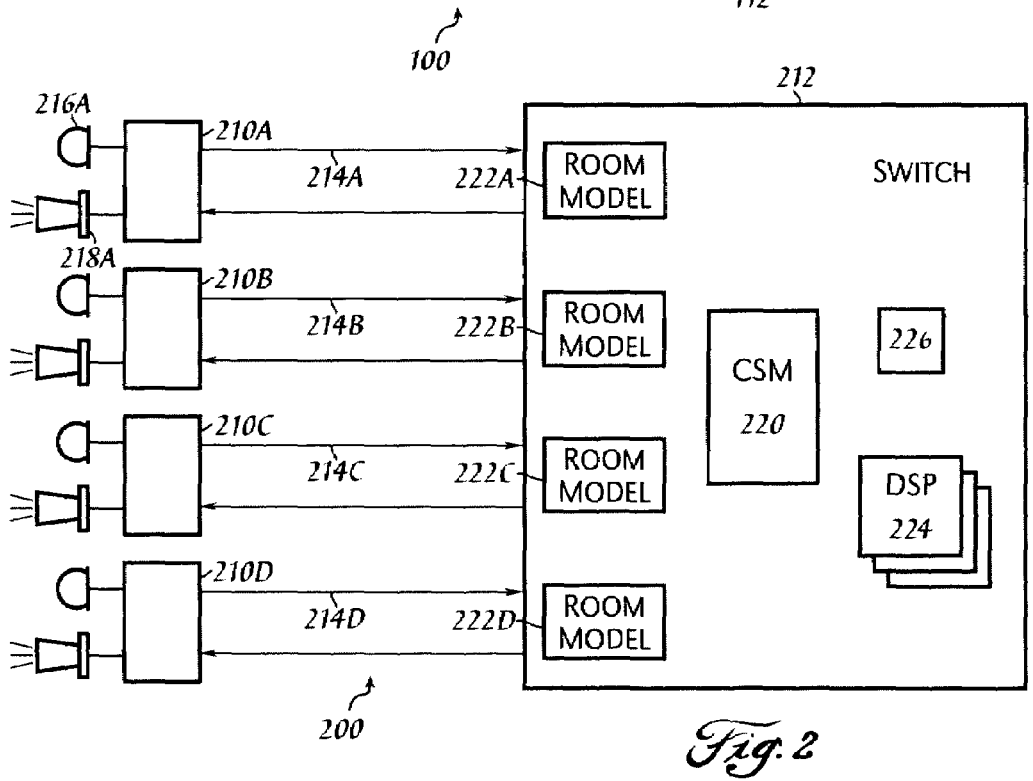
FIG. 2 is a high-level block diagram of an audio communications system according to an embodiment of the present invention.

FIG. 2 is a high-level block diagram of an audio communications system 200 according to an embodiment of the present invention. A plurality of terminals 210A–D are coupled to a processing switch 212 via communications links 214A–D. The terminal types can be heterogeneous. In one embodiment, the terminals include: dedicated speakerphones, desktop handsets with or without speakerphone capabilities, cellular phones, desktop personal computer (PC) systems with audio capabilities, video conferencing systems with audio capabilities, etc. Each terminal 210, of which terminal 210A is representative, preferably includes a microphone 216A and a speaker 218A. Unlike in the system of FIG. 1, the terminals 210 need not, and preferably do not, contain a SP for performing AEC or other complex signal processing. However, the terminals 210 may have SPs for performing other functions, such as analog-to-digital and digital-to-analog-signal conversions and, optionally, data encoding/decoding.

The communications links 214 carry audio data representative of sounds picked up by the microphone 216 and to be played by the speaker 218 to/from the processing switch 212. The communications link 214 may be wired or wireless. Moreover, the links 214 may include dedicated private links, shared links utilizing a publicly-accessible telephone network, and/or links using a public or private data communications network such as the Internet. Data traveling over the links 214 may pass through one or more switches or link types before reaching the processing switch 212 or terminal 210, although a preferred embodiment of the present invention treats a link passing through multiple links and switches as a single logical link. The data carried by the communications links 214 can be digital and/or analog. If the data is digital, it is preferably transmitted as a series of discrete data packets, such as Internet protocol (IP) packets. In one embodiment, the digital data is encoded into a compressed format.

The processing switch 212 switches and routes communications among the terminals 210 and provides signal processing as described herein. The switch 212 can be, for example, a private branch exchange (PBX) located at a business or other entity, a publicly-accessible switch operated by a telephone company or other entity providing audio communications, or an Internet server supporting Internet telephony. Thus, the term "processing switch" includes any device capable of providing the switching and processing functionality attributed to the processing switch 212 described herein.

In one embodiment, the processing switch 212 comprises a dedicated computer system having one or more central processing units (CPUs), a random access memory (RAM), read-only memory (ROM), a storage device such as a hard drive, switching hardware and software, and other hardware and software components for providing switch functionality as is known in the art.

Aggregations of machine-executable code, data, circuitry, and/or data storage areas in the processing switch 212 for performing a specific purpose or purposes are referred to as "modules." Different modules may share common code, data, and/or circuitry. The modules include, for example, modules for receiving and sending data, a digital to analog converter (DAC) module, and an analog to digital converter (ADC) module. The switch 212 can perform multiple tasks simultaneously by allocating a subject of available modules, processors, processing time, or other resources to particular tasks.

According to an embodiment of the present invention, the processing switch 212 has a communications support module (CSM) 220 for supporting communications utilizing shared and centralized signal processing. Under direction of the CSM 220, the switch 212 receives the data provided by the communications links 214, processes the data using centralized resources and modules, and provides the data to the appropriate terminals.

In one embodiment, the CSM 220 associates a room model 222 with each terminal engaged in a communications session. The room model 222 holds room model information including data and/or filters representing the acoustic properties of the terminal 210 and/or the environment surrounding the terminal. For example, in one embodiment the room model 222 holds data representing the reverberation characteristics of the room in which the terminal 210 is located. The room model 222 can also hold data representing an amount of background noise present at the terminal, an amount of automatic gain control (ACG) to be applied to audio data received from the terminal, types of noise reduction to be applied to signals received from or sent to the terminal, or any other information useful for supporting signal processing to be performed on data received from or sent to the associated terminal 210. Room model information held in the room model 222 can also include state information indicating signals previously sent to the associated terminal 210. In one embodiment of the present invention, the resources utilized by the room model 222, such as memory and processing power, are dynamically allocated. For example, if a room is found to have a long reverberation time, a larger memory is allocated to the room model 222 in order to store the sequencing information.

In one embodiment of the present invention, the room model 222 is adaptively developed while the terminal 210 is used in a communications session. This technique is preferred because the room model 222 may change during the course of the communications session. For example, a participant may switch the terminal 210 from a handset to a speakerphone midway through a conversation. Alternatively, the room model can be generated by sending a series of test signals to the terminal at different points during the session.

In one embodiment, room models 222 are persistently stored in the processing switch 212 and retrieved from storage each time an associated terminal 210 is used in a communications session. For example, if the set of terminals interacting with the switch 212 is finite, known, and has relatively constant acoustic properties, it may be more efficient to store a persistent room model for each terminal 210. In contrast, if the switch 212 is a server on the Internet and the set of terminals is unknown and practically infinite, it may be more efficient to generate a new room model each time a terminal establishes a connection with the switch.

The CSM 220 is supported by one or more SP modules 224. The SP modules 224 preferably operate in the digital domain, but may also provide analog processing. Taken together, the SP modules 224 provide a pool of processing resources from which the CSM can draw. During times when the system load is light (i.e., relatively few terminals are engaged in audio communications), correspondingly greater processing resources are available for use with each supported terminal 210. Likewise, when the system load is heavy (i.e., a relatively large number of terminals 210 are engaged in audio communications), the processing resources available for each terminal are diminished.

In a preferred embodiment of the present invention, the CSM 220 monitors the received audio signals and the processing needs of the switch 212 and dynamically allocates and deallocates the processing resources of the SP modules 224 to the signals in order to provide maximum benefit to the active terminals (i.e., terminals having microphones generating audio signals). In one embodiment, this monitoring is performed by analyzing the digital packets received from the terminal 210 over the communications links 214. If the data in the packets forming the signal are determined to represent audio data generated by a person speaking, SP resources allocated to that signal. The amount of resources allocated depends on the amount of SP resources available in the pool. If, on the other hand, the CSM 220 determines from the packets that no one is speaking at the terminal, the CSM preferably digitally mutes the signal and allocates relatively few SP resources to it.

The CSM 220 is preferably supported by a mixing module 226. The mixing module 226 formulates an output mix for each of the terminals 210. In general, each terminal's output mix is comprised of a mix of the received audio signals from the other terminals. If only one terminal is producing an audio signal, then the formulated output mix merely contains the processed audio signal from the SP module 224 and no output mix is sent to the terminal producing the audio signal. In one embodiment, the mixing module 226 is merely a logical construct formed when the CMS 220 uses the SP modules 224 to perform mixing.

Figure 3:
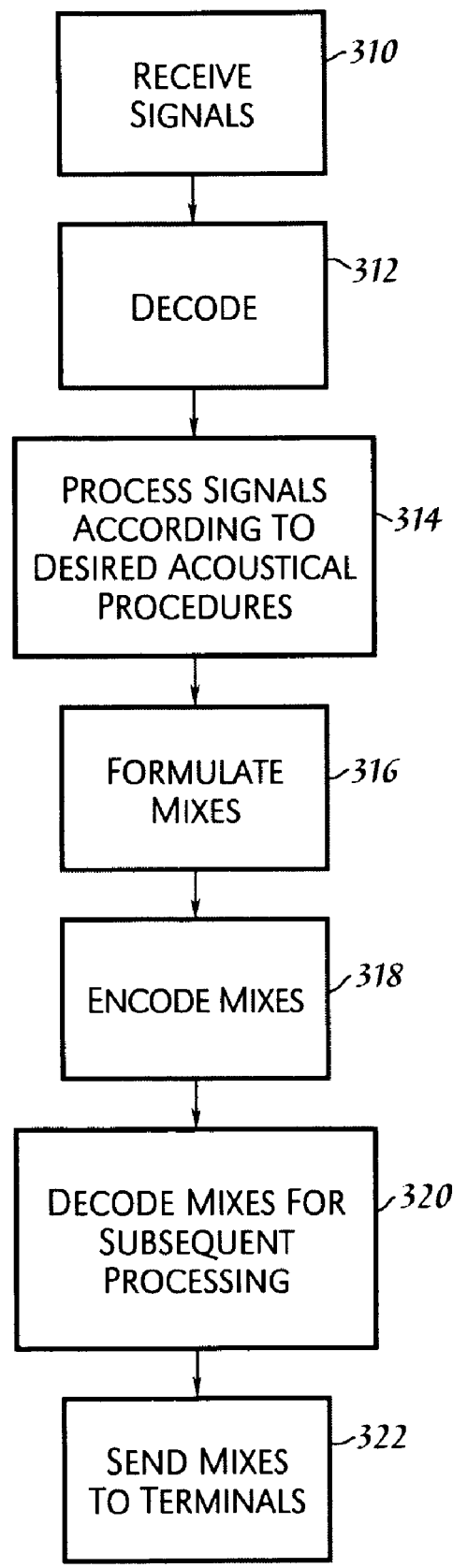
FIG. 3 is a flowchart illustrating the operation of the communications support module according to an embodiment of the present invention.

FIG. 3 is a flowchart illustrating the operation of the CSM 220 when providing real-time centralized signal processing according to one embodiment of the present invention. For purposes of example, assume there are N terminals engaged in a communications session (e.g., N speakerphones engaged in a conference call). N may be a subset of the total number of terminals coupled to the processing switch 212 and there may be multiple communications sessions ongoing simultaneously. As is understood in the art, there are many different ways for the initial communications sessions to be established. For example, all of the participants can call into the switch 212 or one participant can initiate the session by calling the other participants.

At step 310, the processing switch 212 receives audio signals from one of the terminals 210 via the communications links 214. At any given time, one or more of the terminals 210 can produce audio signals and send the signals to the switch 212. Thus, the switch 212 can simultaneously receive audio signals from multiple terminals. Audio signals received by the switch 212 are made available to the CSM 220 and SP modules 224 in the switch.

Next, the CSM 220 uses the SP modules 224 to decode 312 the signals received via the communications links 214, if necessary. As mentioned above, the audio signals can be digitally encoded to compress the signal, detect errors, and/or provide other benefits. The CSM 220 decodes and/or decompresses the audio signals and stores the signals in a format suitable for performing further processing. Since different terminals 210 may use different encoding/decoding methods, the CSM 220 preferably simultaneously supports multiple encoding/decoding methods.

The CSM 220 uses the SP modules 224 to process 314 the decoded signals according to desired acoustic procedures. The types of processing 314 that can be performed on the decoded audio signals include: AEC, AGC, noise reduction, and mixing. Of course, this list is not exclusive and any type of desired processing can be performed on the signals. This processing may utilize the room models 222 and, in addition, may update the room models 222.

For adaptive AEC, the CSM 220 determines which terminals are active. Then, the CSM 220 uses the associated room model 222 to process the signal from that terminal and remove the echo caused by the microphone 216 picking up sounds from the speaker 218. In one embodiment, digital sample values of the audio signals previously sent to the terminal 210 are stored in the associated room model 222. The stored digital sample values are used to estimate the echo returning through the microphone 216 of that terminal and the estimated echo is subtracted on a sample-by-sample basis from the received audio signal. In one embodiment, the outgoing packets bear sequencing information, such as time sequence tags, which is used to determine a correlated time sequence on the returned packets of audio information. In other words, the time sequence tags are used to maintain alignment between the samples delivered to the terminal's speaker 218 and the samples received from the terminal's microphone 216.

For ACG, the CSM 220 isolates times during which local speech at a terminal 210 is thought to be present and then adjusts the signal gain so that the speech is near a predetermined level when considered on average. In one embodiment, the CSM 220 stores data in the room model 222 indicating the amount of signal gain to apply to the associated microphone 216.

For noise reduction, the CSM 220 estimates a frequency dependent profile of the noise floor and attenuates sounds which are temporarily near or below that noise floor. In one embodiment, the CSM 220 stores the estimated frequency dependent profile of a noise floor for a terminal in the associated room model 222.

Once the signal processing is performed 314, the CSM 220 uses the mixing module 226 to formulate 316 output mixes of the signal. If only one terminal 210 is producing an audio signal, and N is the number of terminals 210 engaged in the communications session, then the mixing module 226 formulates N−1 output mixes, where each audio mix is associated with a terminal other than the terminal from which the audio signal was received. In this case, the output mix merely contains the processed signal produced by the SP modules 224. If more than one terminal 210 is simultaneously producing an audio signal, then the mixing module 226 formulates N output mixes—one mix for each terminal. In this latter case, each terminal's mix contains all of the received audio signals except for any audio signal received from the terminal for which the mix was formulated. Since a preferred embodiment of the present invention digitally mutes those terminals at which the CSM 220 determines no one is currently speaking, no processing power is required to mix signals from those terminals. In addition, the output mixes can optionally be further processed according to the room model 222 for the associated terminal 210.

Next, the CSM 220 uses the SP modules 224 to encode 318 each mix into the appropriate format for its associated terminal 210. Since the encoding process can introduce noise or other artifacts into the signal, a preferred embodiment of the present invention decodes 320 each encoded mix and provides decoded mix samples to the associated room model 222. These samples become the sample values used to estimate the echo returning through the microphone 216 of that terminal when performing AEC. Alternative embodiments of the present invention, however, use samples made before the mix is encoded. The CSM 220 sends 322 each mix to its associated terminal via the communications links 214. The terminal 210 plays the mix out of the terminal's speaker 218.

A preferred embodiment of the present invention supports easy upgrades of the processing switch 212 modules. The CSM 220, room models 222, and SP processing 224 modules are preferably software-upgradeable. In addition, one embodiment of the switch can be upgraded by replacing or adding modules. For example, the switch 212 can be upgraded by adding SP modules. In this manner, the performance of the switch 212 can be improved without altering the terminals 210 or otherwise incurring additional cost.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A method for supporting communication among a plurality of terminals, the method comprising steps of:
   receiving an audio signal at a centralized switch to result in a received signal, wherein the centralized switch receives the audio signal from a terminal over a communications medium, wherein the terminal has a microphone located proximate to not more than one active speaker mechanism, wherein the terminal lacks mechanisms for removing an audio feedback portion of the audio signal, wherein the audio feedback portion is caused by the microphone reacting to sound energy from the not more than one active speaker mechanism;
   processing by a signal processor the received audio signal to remove the audio feedback portion resulting in a first filtered signal;
   mixing the first filtered signal with a second filtered signal to result in a mixed signal; and
   transmitting the mixed signal to the terminal over the communications medium.

2. The method of claim 1, wherein the communications medium is wireless.

3. The method of claim 1 further comprising the step of:
   extracting room model information from the received signal, wherein the room model information contains characteristics of the acoustic qualities surrounding the terminal.

4. The method of claim 1, wherein the signal processor performs acoustic echo cancellation on the received signal.

5. The method of claim 1, wherein the signal processor performs automatic gain control on the received signal.

6. The method of claim 1, wherein the signal processor performs noise reduction on the received signal.

7. The method of claim 1 further comprising the steps of:
   extracting room data from the received signal, where in the room data contains characteristics of acoustic properties surrounding the terminal;
   storing portions of the room data in a first room model.

8. The method of claim 7, wherein the room model is adaptively developed and updated while the terminal is engaged in a communications session.

9. The method of claim 7 further comprising the steps of:
   identifying a second terminal engaged in a communications session to result in an identified terminal; and
   retrieving a second room model for the identified terminal.

10. The method of claim 1, the method further comprising the steps of:
    determining an amount of processing power available to process the received signal; and
    allocating processing power to the received signal based on the availability of processing power.

11. The method of claim 10 further comprising the steps of:
    determining whether each of a plurality of received signals has human voice content; and
    assigning processing resources to each of the plurality of received signals based on whether each has human voice content.

12. The method of claim 11 further comprising the steps of:
    determining a plurality of estimations of processing resources needed by individual terminals of the plurality of terminals, wherein the individual terminals are engaged in communications sessions,
    allocating processing resources to the individual terminals based on the plurality of estimations.

13. The method of claim 1 wherein the microphone and the not more than one active speaker are proximate to each other and fixably attached to the terminal.

14. The method of claim 1, wherein the processing step comprises the step of:
performing acoustic echo cancellation on the received signal.

15. The method of claim 1, wherein the processing step comprises the step of:
performing automatic gain control on the received signal.

16. The method of claim 1, wherein the processing step comprises the step of:
performing noise reduction on the received signal.

17. The method of claim 1, wherein the transmitting step comprises the steps of:
sending a time tag, wherein the time tag includes sequencing information for the mixed signal.

18. The method of claim 1 further comprising the step of:
receiving a time tag with the audio signal, wherein the processing step aligns the audio signal responsive to the received time tag.

19. A communications system comprising:
a processing switch coupled to a plurality of terminals, wherein each of the plurality of terminals has a microphone and a speaker proximate to the microphone, wherein the processing switch receives a first audio signal from a first terminal of the plurality of terminals resulting in a first received audio signal, wherein upon receipt, the first received audio has not been processed to reduce acoustic feedback;
a communications support module (CSM) coupled to the processing switch;
a signal processing (SP) module coupled to the CSM, wherein the SP module has digital signal processing resources to reduce acoustic feedback in the first received audio signal to result in a first processed signal, wherein the SP module operates under the control of the CSM,
a room module coupled to the SP module, wherein the room module accesses a plurality of room models, wherein each room model contains acoustic information specific to one of the plurality of terminals, wherein each room model contains data related to the acoustic properties surrounding its respective terminal;
a mixing module coupled to the processing switch and directed by the CSM, wherein the mixing module mixes the first processed signal with a second processed signal to produce an output mix, wherein the output mix is associated with the first terminal; and
a module for sending the output mix to the first terminal for output on the first terminal's speaker, wherein the first terminal has less than two speakers active simultaneously.

20. The communications system of claim 19, wherein the SP module performs acoustic echo cancellation on the first received audio signal.

21. The communications system of claim 19, wherein the SP module performs automatic gain control on the first received audio signal.

22. The communications system of claim 19, wherein the SP module performs noise reduction on the first received audio signal.

23. The communications system of claim 19 further comprising:
a decoding module for decoding the first received audio signal; and
an encoding module for encoding the output mix prior to the output mix being sent to the first terminal.

24. The communications system of claim 19, wherein the CSM determines, responsive to a load on the communications system, an amount of SP module processing resources to allocate to individual audio signals within a plurality of received audio signals.

25. The communications system of claim 19, wherein the CSM determines, responsive to characteristics of each of a plurality of received audio signals, an amount of SP processing resources to allocate to individual audio signals within a plurality of audio signals.

26. The communications system of claim 23, wherein the decoding module is adapted for decoding at least one encoded output mix to produce a decoded encoded output mix, wherein the decoded encoded output mix is used by the SP module to perform acoustic echo cancellation.

27. The communications system of claim 23, wherein the room module updates a first room model based on data extracted from the first received audio signal, wherein the data is indicative of acoustic characteristics of an area surrounding the first terminal.

28. A system for supporting a communications session among a plurality of terminals, the system comprising:
a communications support module (CSM) for determining whether a first terminal of the plurality of terminals is active, wherein responsive to determining that the first terminal is active, the CSM allocates pooled feedback-reducing resources to the first terminal, wherein responsive to determining that the first terminal is not active, the CSM deallocates pooled feedback-reducing resources from the first terminal;
a receiving module for receiving a first audio signal from the first terminal, wherein the first audio signal has a feedback component caused by the proximity of a first terminal's speaker to a first terminal's microphone, wherein the first terminal has less than two speakers active simultaneously;
a room module for storing a first room model associated with the first terminal, wherein the first room model contains information relates to acoustic properties influenced by the environment surrounding the first terminal's microphone and speaker; and
a centralized signal processing (SP) module for performing SP on the first audio signal to compensate for the feedback component, wherein performing SP on the first audio signal results in a first processed signal, the wherein performing SP on the first audio signal is responsive to the first room model; and
a sending module for sending the first processed signal to the first terminal.

29. The system of claim 28, further comprising:
a mixing module for mixing the first processed signal with a second processed signal to result in a first mixed signal, wherein the sending module sends the first mixed signal to the first terminal.

30. The system of claim 28, wherein the SP module is adapted to perform acoustic echo cancellation on the first audio signal.

31. The system of claim 28, wherein the SP module is adapted to perform automatic gain control on the first audio signal.

32. The system of claim 28, wherein the SP module is adapted to perform noise reduction on the first audio signal.

33. The system of claim 29, wherein the first audio signal is encoded, the system further comprising:

an encoding/decoding module for decoding the first audio signal and for encoding the first mixed signal.

34. The system of claim 28, wherein the SP resources are allocated to the first audio signal responsive to a total number of available SP resources.

35. The system of claim 28, wherein the SP resources are allocated to the first audio signal responsive to content characteristics of the first audio signal.

36. The method of claim 28, wherein the first audio signal is sent in data packets, wherein determining whether the first terminal is active comprises the steps of:

analyzing a plurality of received data packets to determine whether the plurality of data packets originate from the first terminal.

* * * * *